United States Patent [19]

Pauley et al.

[11] Patent Number: 4,952,913
[45] Date of Patent: Aug. 28, 1990

[54] TAG FOR USE WITH PERSONNEL MONITORING SYSTEM

[75] Inventors: James D. Pauley, Estes Park; Allen E. Ripingill, Jr., Louisville, both of Colo.

[73] Assignee: B. I. Incorporated, Boulder, Colo.

[21] Appl. No.: 446,212

[22] Filed: Dec. 4, 1989

Related U.S. Application Data

[63] Continuation of Ser. No. 231,823, Aug. 12, 1988, Pat. No. 4,885,571, which is a continuation of Ser. No. 852,831, Apr. 15, 1986, abandoned.

[51] Int. Cl.$^5$ .......................... G08B 23/00; H04B 1/34
[52] U.S. Cl. ...................... 340/573; 340/514; 340/825.49; 455/100
[58] Field of Search .................. 340/572–576, 340/514–516, 539, 825.49; 455/100

[56] References Cited

U.S. PATENT DOCUMENTS

| | | | |
|---|---|---|---|
| 3,478,344 | 11/1969 | Schwitzgebel | 340/312 |
| 3,882,277 | 5/1975 | DePedro | 179/2 DP |
| 3,898,984 | 8/1975 | Mandel | 128/2.1 A |
| 4,259,665 | 3/1981 | Manning | 340/575 |
| 4,285,146 | 8/1981 | Charles et al. | 40/21 C |
| 4,578,539 | 5/1986 | Townsing | 379/97 |
| 4,598,275 | 7/1986 | Ross et al. | 340/573 |
| 4,622,544 | 11/1986 | Bially et al. | 340/573 X |
| 4,665,387 | 5/1987 | Cooper et al. | 340/572 |
| 4,682,155 | 7/1987 | Shirley | 340/573 |
| 4,747,120 | 5/1988 | Foley | 379/38 |
| 4,885,571 | 12/1989 | Pauley et al. | 340/573 |

FOREIGN PATENT DOCUMENTS 2141006A 12/1984 United Kingdom .

OTHER PUBLICATIONS

A. K. Schmidt, "Electronic Monitoring Equipment", NIJ Reports, Feb. 28, 1986.
"Judge Orders House Arrest"; LA Times; 11 Sep. 1985; Part I, p. 3.
"State to Test Electronic Home Jail"; Albuquerque Journal; 9 Mar. 1983; pp. A-1, A-3.
"Electronic Handcuff Keeps Tabs . . ."; The Oregonian; 10 Mar. 1983; p. B-12.
"Computer-Age Ball & Chain"; Arizona Republic; 13 Mar. 1983.
"Electronic Handcuffs . . ."; Houston Chronical; 11 Mar. 1983.
"Big Brother . . . Test Program"; Albuquerque Tribune; 9 Mar. 1983; p. A-3.
(List continued on next page.)

Primary Examiner—Joseph A. Orsino
Assistant Examiner—Thomas J. Mullen, Jr.
Attorney, Agent, or Firm—Fitch, Even, Tabin & Flannery

[57] ABSTRACT

A tag for use with an individual monitoring system. The tag is worn by an individual being monitored, preferably on the ankle or leg where it can be concealed by the clothing of the individual. The tag is fully self contained and sealed. The circuits of the tag periodically generate an identification signal that includes an identification code. The identification signal modulates a stable RF signal that is transmitted in bursts of data words to a receiver associated with a field monitoring device (FMD) located at the monitoring location. In turn, the FMD may randomly establish communication with a central processing unit (CPU) located at a central monitoring location. Other information is included in the identification code of the tag, such as information indicating that an attempt has been made to remove the tag from the individual. The tag is held in place near the skin of it's wearer by a conductive strap that wraps around the leg or other limb of the individual. Two capacitive electrodes, one of which is realized with the conductive strap, function as the plates of a capacitor, with the body flesh serving as the dielectric material therebetween. By monitoring an alternating signal coupled from one capacitive electrode to the other, a determination can be made as to whether the tag has remained near the body flesh. Further, because the strap is conductive, a signal can be passed therethrough and a determination can be made as to whether the strap has been broken.

11 Claims, 6 Drawing Sheets

OTHER PUBLICATIONS

"No Complaints About Food"; Time Magazine; 21 Mar. 1983, p. 23.
"Wearing a Jail Cell . . . "; Newsweek Magazine; 21 Mar. 1983, p. 53.
"Electronic Monitoring . . . Contract Woes"; Albuquerque Journal; 16 Mar. 1983; pp. A-1, A-3.
"District Judge Tests Electronic Monitor"; Albuquerque Journal; 18 Mar. 1983; pp. A-1, A-3.
"Electronic Handcuffs Tested"; LA Times; 18 Mar. 1983; Part I; p. 1.
"State Justices to Hear Argument . . . "; Albuquerque Journal; 13 Apr. 1983; p. B-2.
"High Court Studies Electronic Cuffs"; Albuquerque Journal, 13 Apr. 1983, p. B-2.
"Court Silent on Electronic Cuffs"; Albuquerque Journal, 15 Apr. 1983, p. A-7.
"Sentenced to Wear Electronic Ankle Cuffs"; The News-Sun, 18 Apr. 1983, p. 4-A.
"Judge Sentences Bad-Check Writer . . . "; Albuquerque Journal, 16 Apr. 1983, p. B-2.
"Offender's Weekend . . . "; Albuquerque Journal, 26 Apr. 1983, p. B-1.
"Spiderman Cartoon . . . "; Star, 24 Apr. 1983.
"Shackled"; Albuquerque Tribune; 30 Apr. 1983.
"Arrest Ordered . . . "; Albuquerque Journal; 7 May 1983.
"Electronic Bracelet Attracts Attention"; The Hobbs Flare; 5 May 1983, p. 4.
"Electronic Anklet Jail . . . "; The Daily Dispatch; 27 Apr. 1983, p. 32 (Moline, Ill.).
"Don't Give Up, Judge"; Albuquerque Tribune; 10 May 1983.
"Electronic Cuff Test Winds Down . . . "; Albuquerque Tribune; 8 Jun. 1983.
"Illinois Plans Shackles Program"; Albuquerque Journal; 12 Jun. 1983, p. A-8.
"Electronic Anklet Keeps Probationers Out of Jail"; Business Briefs; A.I.D.S.; Jun. 1983.
"Electronic Shackles . . . "; Chicago Tribune; 26 Jun. 1983.
"House Arrest"; Forum Newsfront; Playboy Magazine; Aug. 1983.
Tybor, "Locking Up Old Ideas on Jail Sentences"; New London, Conn., Day, 16 Aug. '83.
"Web Ringer"; Albuquerque Journal; 29 Sep. 1983, p. A-3.
"Justice Dept. Picks Up Tab . . . "; Albuquerque Journal; 15 Oct. 1983.
"Reliance on Probation is Increasing . . . "; Wall St. Journal; 16 May 83.
"The GOSSlink"; National Incarceration Monitor and Control Services, Inc. (NIMCOS), New Mexico, 4 page brochure (1983).
"CSD Home ESCORT Electronic Monitoring System: The Electronic Alternative to Jail and Prison for Probationers, Parolees, and Work Releases"; Control Data Corporation, CD Corrections Systems, Minneapolis, Minn., 6 page brochure (1985).
"Can You Spot the One Who's Doing Time?"; Control Data Corporation, CD Corrections Systems, 4 page fold-out brochure (1985).
Meyer, "Crime Deterrent Transponder System"; IEEE Transactions on Aerospace and Electronic Systems; pp. 2-22 (Jan. 1971).
Schwitzgebel and Bird, "Sociotechnical Design Factors in Remote Instrumentation with Humans in Natural Environments"; Behav. Res. Meth. & Instru.; 1970, vol. 2(3); pp. 99-105.
Ford & Schmidt, "Electronically Monitored Home Confinement"; NIJ Reports/SNI 194, Nov. 1985.
Ingraham and Smith, "The Use of Electronics in the Observation and Control of Human Behavior and Its Possible Use in Rehabilitation and Parole"; Issues in Criminology, vol. 7, No. 2 (Fall, 1972).
Hatchett, "The Home Confinement Program: An Appraisal of the Electronic Monitoring of Offenders in Washtenaw County, Mich."; Program Bureau, Michigan Dept. of Corrections, Jun. 1987.

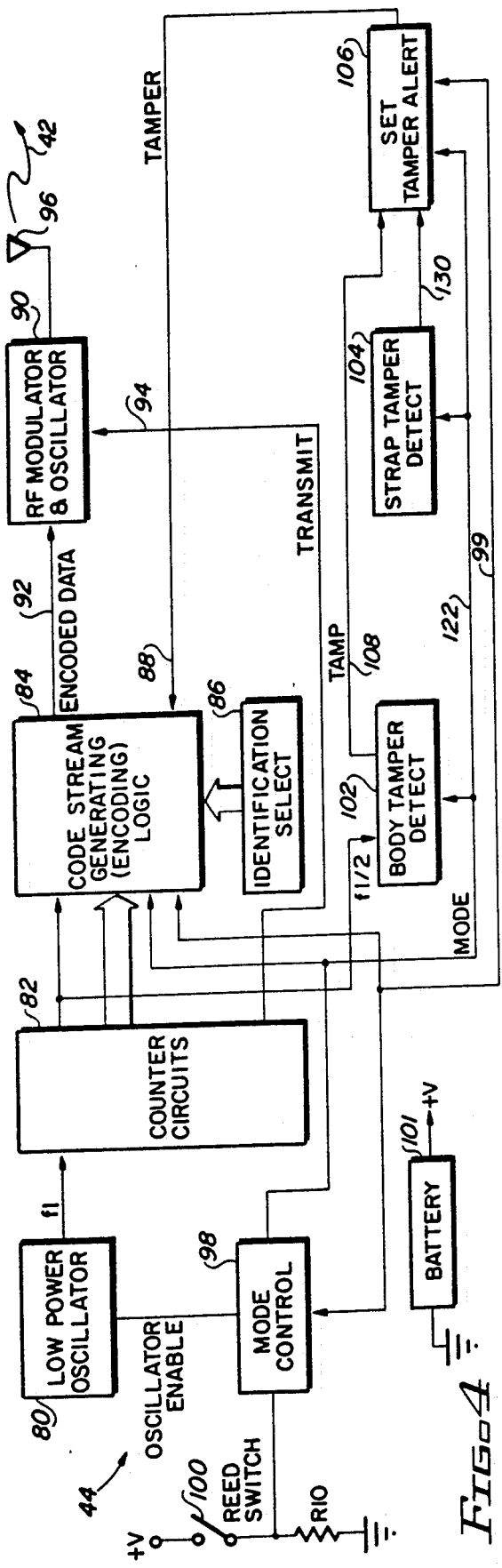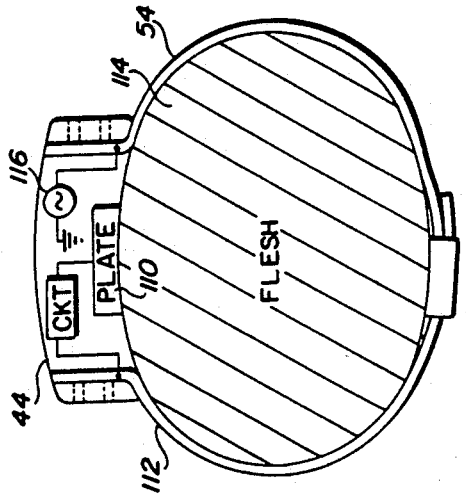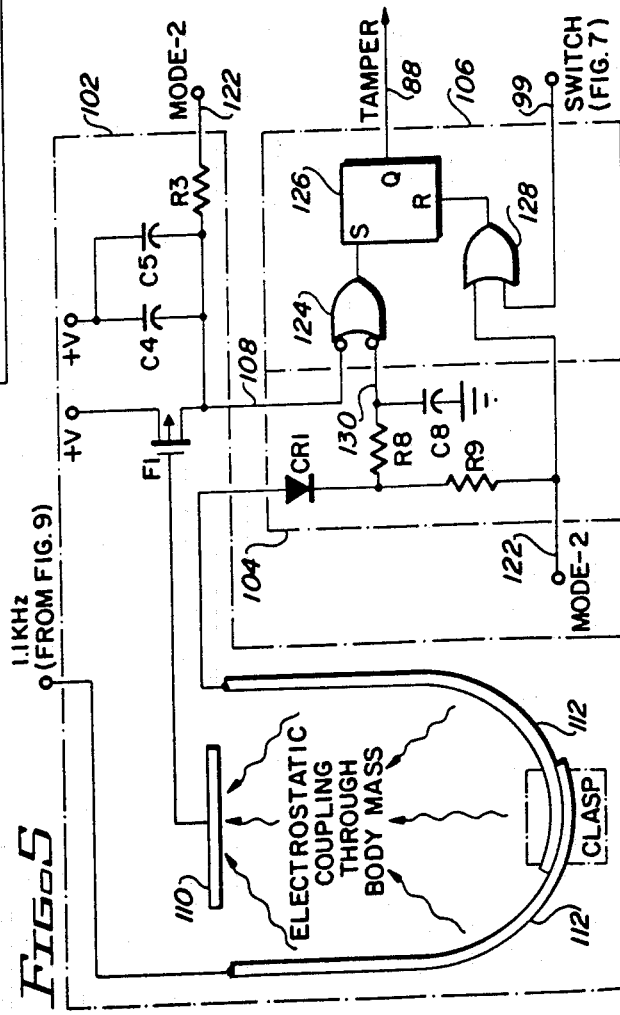

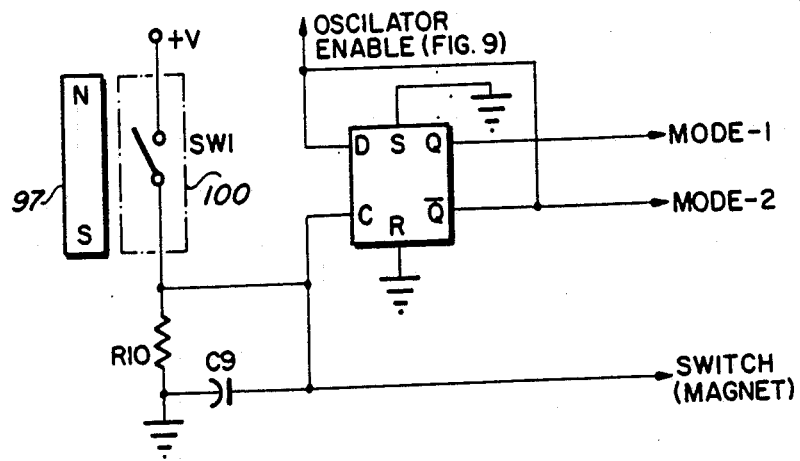
*Fig. 7*
| SWITCH (MAGNET) | OSCILLATOR ENABLE | MODE-1 | MODE-2 | COMMENT |
|---|---|---|---|---|
| 0 (SW1 OPEN) | HIGH | 0 | 1 | OFF |
| 1 (SW1 CLOSED) | LOW | 1 | 0 | CONTINUOUS MODULATION |
| 0 (SW1 OPEN) | LOW | 1 | 0 | ON |
| 1 (SW1 CLOSED) | HIGH | 0 | 1 | CONTINUOUS CARRIER |
*Fig. 8*
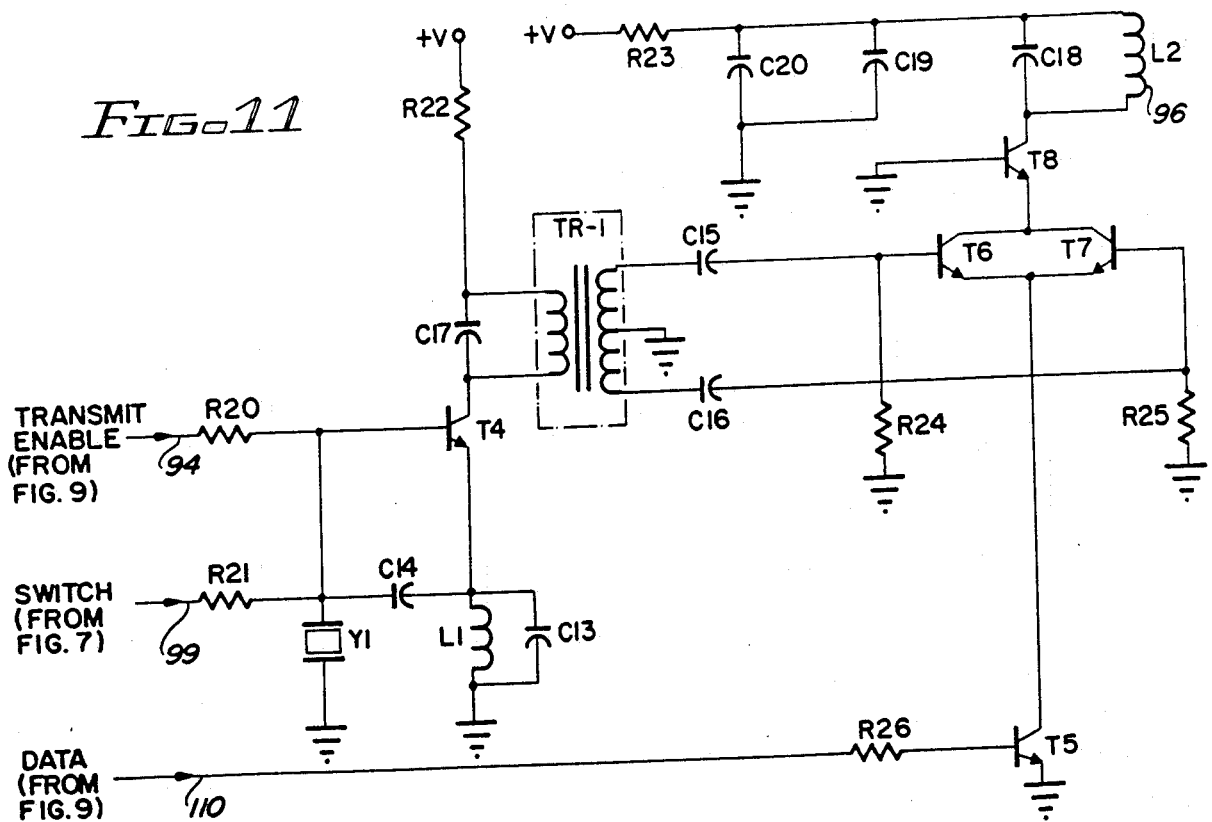
*Fig. 11*

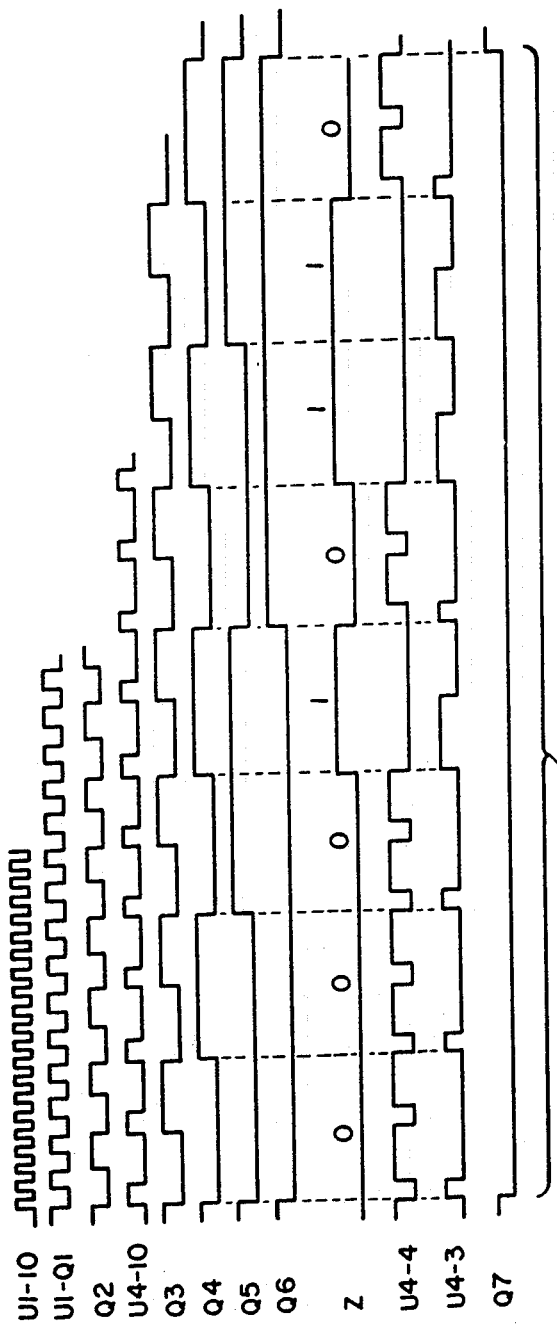
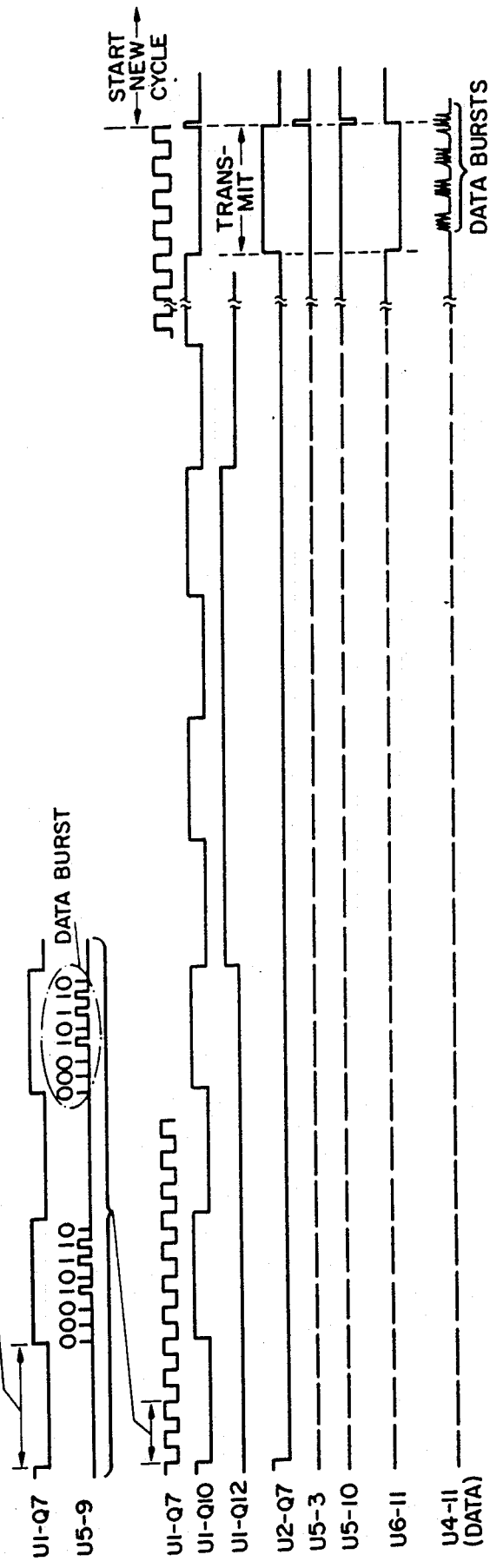
Fig. 10

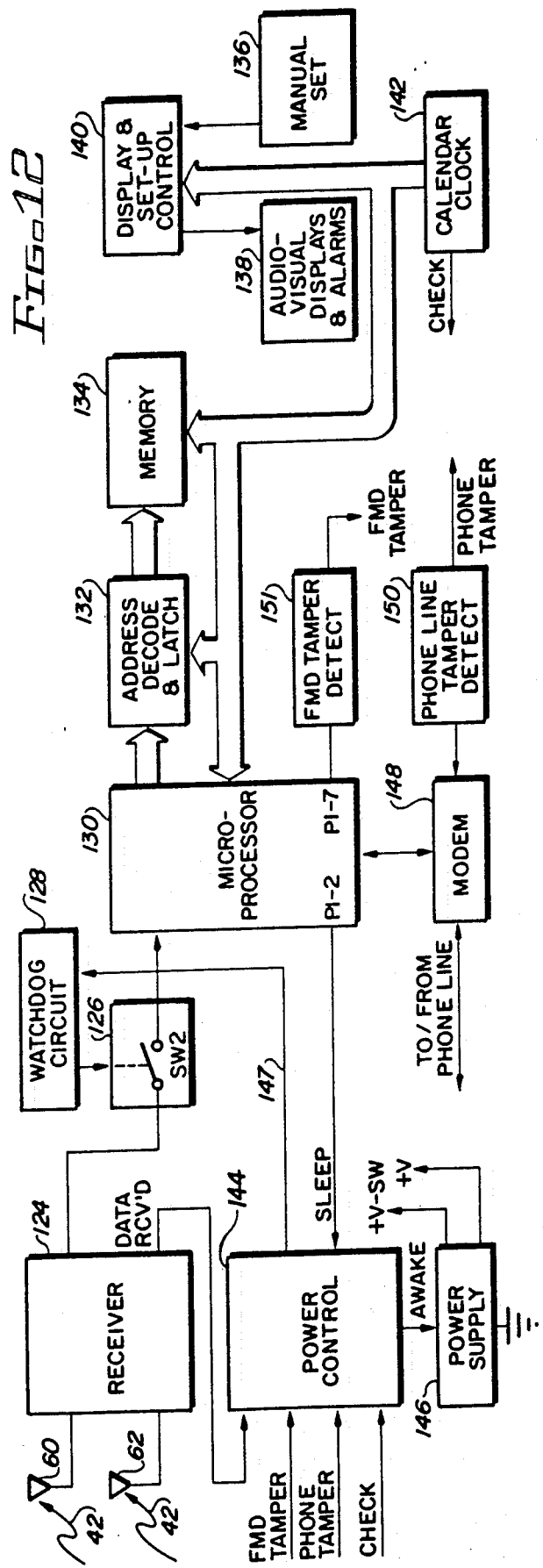

TAG FOR USE WITH PERSONNEL MONITORING SYSTEM

This application is a continuation of application Ser. No. 07/231,823, filed Aug. 12, 1988, now issued as U.S. Pat. No. 4,885,571; which is a continuation of application Ser. No. 06/852,831, filed Apr. 15, 1986, abandoned.

BACKGROUND OF THE INVENTION

The present invention relates to a tag for use with a personnel monitoring system. More particularly, the invention relates to a tag for use with a house arrest or other monitoring system wherein individuals who wear the tag can be monitored for compliance with orders or instructions to remain at a prescribed location. Even more particularly, the present invention relates to such a tag that includes anti-tamper circuits therein so that any attempt to remove the tag can be detected and signaled to a central monitoring location.

To illustrate a potential application of a personnel monitoring system, reference is made to a newspaper article appearing in the *Los Angeles Times* on Wednesday, Sep. 12, 1985, Part I, page 3. The article indicated that on Tuesday, Sept. 10, 1985, U.S. District Judge Terry J. Hatter, Jr. sentenced David Alan Wayte to spend "six months under house arrest at his grandmother's home for failing to register for the military draft." While this was reported as "one of the most unusual sentences in recent memory," it is believed to represent a major trend for future sentencing of non-violent offenders. This is particularly evident in view of the ever overcrowded prisons and jails that exist in every jurisdiction across the U.S. and throughout the world House arrest thus represents a very significant and viable alternative to conventional incarceration of convicted law breakers, especially those found guilty of non-violent crimes.

While those sentenced to house arrest will generally recognize the need and benefit of complying with the sentence imposed, there nonetheless remains the need to monitor the presence or absence of such individuals to ensure that the sentence imposed is being followed so that justice can be satisfied. For example, in the instance cited above, the attorneys for the convicted individual, David Wayte, wanted the judge to impose community service work as punishment. While community service may be a very appropriate sentence to impose in some instances, the judge felt that because Mr. Wayte was already doing community service on a regular basis, a sentence of house arrest should be imposed to punish Wayte by not allowing him to perform such service. Hence, if Wayte were to violate his sentence by leaving his grandmother's house without the knowledge of the court, the purposes of Judge Hatter's sentence would be frustrated.

While monitoring the presence or absence of a single individual at a prescribed location may seem like an easy task, it really is not. Moreover, where there are a large number of individuals who must be monitored, each at a different "house-arrest" location, the problem becomes exceedingly more complex, especially where some of the individuals may not want to fully comply with the need to wear the tag at all times. Hence, there is a need in the art for a system that can efficiently and accurately monitor the presence or absence of a large number of individuals who have been sentenced to remain at specific locations under house arrest. Advantageously, such a system could also be used to monitor the presence or absence of those individuals on parole, i.e., those individuals who are more or less free to move about as they want during certain hours of the day, but who must "report in" at specified locations at specified times. There is a further need to provide a tag that can be comfortably worn by those individuals being monitored but that can not be removed or tampered with without being detected.

The present invention meets this need by providing an electronic monitoring system that inexpensively and accurately monitors the house-arrest location of a large number of individuals at a wide variety of different locations. Moreover, such monitoring is accomplished in a way that is not readily noticeable to those persons with whom the monitored individuals come in contact at the house-arrest location, and in a way that is essentially tamper-proof and secure, with suitable alarm messages being promptly given at a central monitoring location in the event that anything out of the ordinary is sensed at a given house-arrest location.

Electronic monitoring systems used to determine and monitor the location of individuals are known in the art. The concept of such electronic personnel monitoring systems probably existed long before the technology was available to realize them. Fictional accounts have long referred to the concept of an electronic personnel monitoring system (e.g., the "Spider Man" comic strip). Numerous press reports have also broadly discribed the benefits of such systems, but have not disclosed the technology for how such systems could be realized, other than in the broadest of terms.

In Schwitzgebel, et al , U.S. Pat No. 3,478,344, there is disclosed a prisoner monitoring system that keeps track of the location of prisoners within a specified boundary. This is accomplished by a system that uses RF transmitters, mounted on the wrist of the prisoner being monitored, and an array of directional antennas that can determine the location of a transmitter with respect to the antenna array. The wrist RF transmitter is powered by a battery pack worn on the prisoner's belt. Two batteries are employed so that the unit remains powered if one battery is removed. The wrist band includes a conductive wire therein that, if broken or cut, is used to signal that the wrist band has been improperly removed.

While the system disclosed in Schwitzgebel may have represented an important advance in the art at the time it was made (1965), there are many reasons why the system disclosed in Schwitzgebel may not provide a viable house arrest system for use today. For example the large battery pack is unsightly and is cumbersome for the prisoner to wear. The antenna array that must be placed around the premises is likewise unsightly and draws attention to the fact that the location is being monitored. Moreover, the conductive wire check of the wrist band could be easily circumvented if a prisoner wanted to remove the device without being detected. Further, external RF signals could easily interfere with the intended RF signal, or external RF signals could be beamed into the monitored area by an outside accomplice in order to "jam" the system.

In Mandel, U.S. Pat. No. 3,898,989, an ambulatory patient monitoring system is disclosed. A telemetry system using a single RF frequency for each individual to which the system is attached monitors critical body functions. FM modulation is used. A transponder unit worn by the individual is triggered by an interrogating signal, in response to which interrogating signal selected information about the individual, as sensed by special sensors on the individual, is transmitted to a receiver. In this way, the receiver is able to monitor certain body functions of the patient being monitored. However, location information about the patient is not included in the transmitted information.

In DePedro, U.S. Pat. No. 3,882,277, electrocardiograph information is telemetered from a patient to a telephone transmission link system that carries the information to a central monitoring location. Thus, a combined telemetry and telephone transmission system is employed to monitor physiological signals. However, as disclosed, such physiological signals do not include the location of the patient being monitored.

In the UK Pat. Application of Anders et. al., GB2141006A, a system is disclosed that measures location, identification, or motion. The system therein described uses "passive" tags that may be placed on movable objects. The location of any of these movable objects may be ascertained through a system that uses active transceivers to interrogate the passive tags. In response to such interrogation, the passive tags transmit an identification code. The location of the tag is sensed through the use of multiple antennas spaced at predetermined intervals, or through repeater-relay transceivers spaced at predetermined intervals, around the area being monitored.

From the above it is seen that the prior art teaches electronic monitoring systems that monitor the presence or absence of individuals from a prescribed location and/or specified parameters of an individual at remote locations. To accomplish such monitoring, it is known to use tags worn by movable objects or individuals, RF telemetry to and from such tags, repeaters, and telephone transmission links.

Despite these teachings of the art, however, no viable house arrest monitoring system has yet been developed to applicants' knowledge. This is because there are numerous features that must be present in a viable house arrest monitoring system that are lacking in the teachings of the prior art. For example, it is desirable to have the electronic tag or other device that identifies the individual being monitored (usually some sort of transponding device) to be worn at a location that is not readily visible to the casual observer and at a location where it cannot be removed by its wearer, but at a location where it will not unduly interfere with the activities of its wearer. This requirement can be met if the tag is worn on an ankle, thereby allowing the tag to be readily concealed by the clothes (pants leg and/or sock) of its wearer. However, such use causes the tag to be located very close to the ground, or floor level. When the floor level comprises earth or concrete, as is often the case, some significant transmission problems can result. This is because the RF signal, by necessity a fairly weak signal that is generated for a limited transmission range from a limited energy source, is either absorbed in, or otherwise destructively reflected from the earth or concrete surface. Further, concrete is often heavily laced with reinforced steel, which also tends to interfere with reliable low-energy RF transmissions. Moreover, the walls of the structure whereat the house arrest is being performed may have wire mesh or other metal objects therein that destructively interfere with the transmission of low-energy RF signals.

Simply increasing the energy of the RF signals transmitted from the tag is generally not a viable solution to this problem. In the first place, the tag only has a limited energy source, and it is desirable to have this energy source last for as long as possible. In fact, in accordance with the teachings of the invention herein, the limited energy source (a battery) should be permanently sealed in the tag so that the wearer of the tag has no access thereto. In the second place, higher energy RF signals create numerous other problems for those in the vicinity of the transmission, and as such, must be carefully regulated by the FCC or other regulatory agencies.

A further feature that desirably exists in a viable house arrest monitoring system is that readily noticeable or visible antennas or antenna arrays not be used. Such antennas immediately draw attention to the fact that a house arrest situation exists. Accordingly, the antennas that are used should be of the low profile variety that readily blend into the surroundings of a typical house environment. Further, such antenna(s) and related circuitry must be able to reliably pick up or sense the desired signal and discriminate against destructive reflections or external signals that may be present within the house-arrest structure.

Still a further feature the of critical importance to the successful use of a house arrest system is the integrity of the system. That is, all components of the system at the house-arrest location must be able to sense and signal the occurrence of any attempts to tamper therewith. Further, while there is nothing that can absolutely prevent the destruction of the system's components at the house arrest location, it is desirable that such destruction or attempted destruction be promptly communicated to a central processing location so that appropriate follow up action can be performed. Most importantly, the electronic identification (ID) tag that is worn by the person under house arrest must not be removable. At a minimum, any attempts to remove the tag should be detectable.

SUMMARY OF THE INVENTION

The present invention provides a realiable house arrest system that automatically verifies the presence or absence of prisioners or other personnel who are required to remain at prescribed location or to report in at the prescribed location at a certain time. Advantageously, the prescribed location may be a conventional house, apartment, or other building not intended for use as a prison or custodial facility. Typically, the prescribed location will be a residential house or apartment where other individuals, such as the family of the individual being monitored, may live and work with the individual under house arrest. While such other family members will typically not be under house arrest, the present invention advantageously contemplates that more than one individual under house arrest may share the prescribed house-arrest location, each being individually monitored.

More specifically, the present invention is directed to an identification tag that is worn by the individual under house arrest. Typically, this tag will be worn on the ankle of the individual, and its small size advantageously allows the clothing of the individual to readily conceal the fact that the tag is being worn. The identification tag periodically, such as every 120 seconds transmits an identification signal that includes a prisoner identification code. This code uniquely identifies the individual being monitored. Other information is also included in the transmitted signal, such as information indicating that someone has attempted to tamper with or remove the tag.

The identification signal generated by the tag is received by a Field Monitoring Device (FMD) that is located within the house-arrest location. A repeater may be selectively positioned around or within the house-arrest facility in order to assure that the FMD always receives an identification signal regardless of the location of the tag (that is, regardless of the location of the individual wearing the tag) within the facility or surrounding environs. The repeater receives the information signal from the tag, holds it for a very short time, and retransmits it. The reception patterns associated with the FMD and the tag for all possible locations of the tag within the facility are checked at the time of installation. This initial check identifies any "dead spots" or tag locations where the tag's identificaion signal is not properly received by the FMD. The repeater can then be selectively positioned within the house-arrest facility in order to eliminate the effect of such dead spots, thereby helping to assure reliable communication between the tag and the FMD.

The FMD, in accordance with the preferred embodiment, includes a modem for communicating with a central processing unit (CPU) via a telephone link. Other types of communication links, such as microwave or satellite links, could also be employed to couple the FMD to the CPU. Normally, the FMD's will call the CPU whenever there is a change associated with the identification signal sensed (received) by the FMD. For eXample, if the identification signals have been regularly received from the tag and the signal stops being received, the FMD will call the CPU and log a "leave" message. If no signals are being received by the FMD and signals appear, the FMD will call the CPU and log an "enter" message. Such time logs permit the system to determine the approximate time when an individual being monitored "checks out" or leaves and "checks in" or enters the house arrest location. Additionally, the various FMD's call the CPU at preestablished times stored by the FMD's and CPU's.

Advantageously, the FMD monitors the information signals received from each tag (an FMD can receive signals from a plurality of tags) to determine if a tamper condition exists. A tamper condition exists if any attempt is made by anyone at the house-arrest location to monitor the presence and absence and to remove, alter, or otherwise interfere with the normal operation of the system, including the tag and the circuits of the FMD. In such situations, the FMD includes the capability of calling up the CPU to alert it of such a tamper condition.

The CPU is located at a remote location from the house-arrest facility, and includes the means for establishing a telephone or other communication link with a large number of FMD's at a large number of house-arrest locations. As indicated above, the FMD's normally call the CPU whenever a leave, enter or tamper condition occurs. Additionally, the CPU will call the various FMD's on a random basis in order to determine if all is well at each location called. If the CPU is unable to establish a telephone link with a given FMD after a prescribed number of attempts, which failure might occur, for example, if the telephone lines or other communication channels had been tampered with, the CPU generates an alarm condition so that appropriate steps can be taken to find out what has happened. Similarly, if the CPU receives a call from an FMD indicating that a tamper condition has been detected, an alarm condition is generated. Advantageously, the CPU is programmed to generate a wide variety of reports that can be used by the monitoring personnel in order to quickly and efficiently determine the status of all of the individuals being monitored at the various house-arrest locations.

A feature of the present invention is that the house arrest system, in addition to automatically verifying the presence or absence of prisoners, also monitors the operating condition of the equipment used, thereby providing a means for allowing preventative maintenance to be performed in a timely manner.

An additional feature of the present invention is that the identifying tag worn by the prisoner or other individual being monitored is a self-contained tag that is light-weight, tamper resistant, and that can be worn on a limb of the individual in an unobtrusive manner. Further, the tag is completely sealed, thereby protecting the electronic circuits contained therein from exposure to damaging environments. The tag's housing is made from a substance that is impervious to water and other fluids to which the tag might be exposed. Further, the tag's housing is made from a substance that is comfortable and safe to wear when placed against the skin of the individual who must wear it.

Most significantly, an important feature of the present invention is that once the tag is placed on the leg or other limb of the individual being monitored, thereby placing the tag in proximity to the individual's skin, any removal of the tag from the leg or other limb can be detected. This is accomplished by combining a continuity check of a conductive strap or band that holds the tag on the individual with a capacitive sensing circuit that senses when the tag is near human flesh and when it is not.

Because the tag is sealed, including the battery that is used to power the circuits contained therein, an important feature of the tag is the ability to preserve the life of the battery for as long as possible. Accordingly, the operating circuits of the tag are configured such that they can initially be totally shut down, as when the tag is first manufactured but before it has been assigned to be worn by an individual under house arrest, thereby preserving the life of the batteries contained therein. However, the tag circuits can be selectively switched to operate in a test mode when the device is first used at a house-arrest location, thereby allowing initial verification of the operation of both the tag and the FMD, followed by a normal operating mode. Such modes of operation are controlled, in the preferred embodiment, by the selective application of a magnetic field.

A further feature of the present invention is that the system is able to reliably operate even in very noisy RF environments. Special transmitting circuitry housed in the tag, coupled with corresponding receiving circuitry housed in the FMD, and additionally data decoding software allow the FMD to reliably discriminate between the intended RF signal generated by the tag and noise.

Still another feature of the present invention is the ability of the FMD to continue its monitoring operation of the tag or tags within the prescribed house-arrest location even in the event of a line power failure. Such a power failure might occur, for example, if the FMD is unplugged (either accidentally or on purpose), or if a wide-spread power failure hits the area where the house-arrest facility is located. Further, even if telephone service is temporarily interrupted, thereby precluding communication between the FMD and the CPU, the FMD continues to store in its memory the events that occur during this time, as sensed by the various sensing circuits housed in the FMD and the information received from the tag in its regularly transmitted information signal, for subsequent replay back to the CPU once a communication link is reestablished.

BRIEF DESCRIPTION OF THE DRAWINGS

The above and other features and advantages of the present invention will be more apparent from the following more particular description thereof presented in conjunction with the following drawing wherein:

FIG. 4 is a block diagram of the circuits contained in the tag of FIG. 1;

FIG. 5 is a schematic/logic diagram of the Tamper Detect and Strap Continuity Check circuits of the Tag of FIG. 4;

FIG. 6 is a cross-sectional view of the tag as it is worn or placed near the flesh or skin of its wearer, and illustrates the capacitive plates or electrodes contained within the tag and strap and their relationship to the flesh of the wearer;

FIG. 7 is a schematic/logic diagram of the Mode Control circuit of the Tag of FIG. 4;

FIG. 8 is a chart or table that illustrates the operating modes of the tag as controlled by the Mode Control circuit of FIG. 7;

FIG. 10 is a timing diagram that illustrates some of the key signals associated with the operation of the circuits of FIG. 9;

FIG. 11 is a schematic/logic diagram of the RF Modulator and Transmitter of the tag of FIG. 4; and FIG. 12 is a block diagram of the FMD of FIG. 1.

DETAILED DESCRIPTION OF THE INVENTION

The present invention is best understood with reference to the drawings, wherein like numerals are used to represent like parts throughout.

Figure 1:
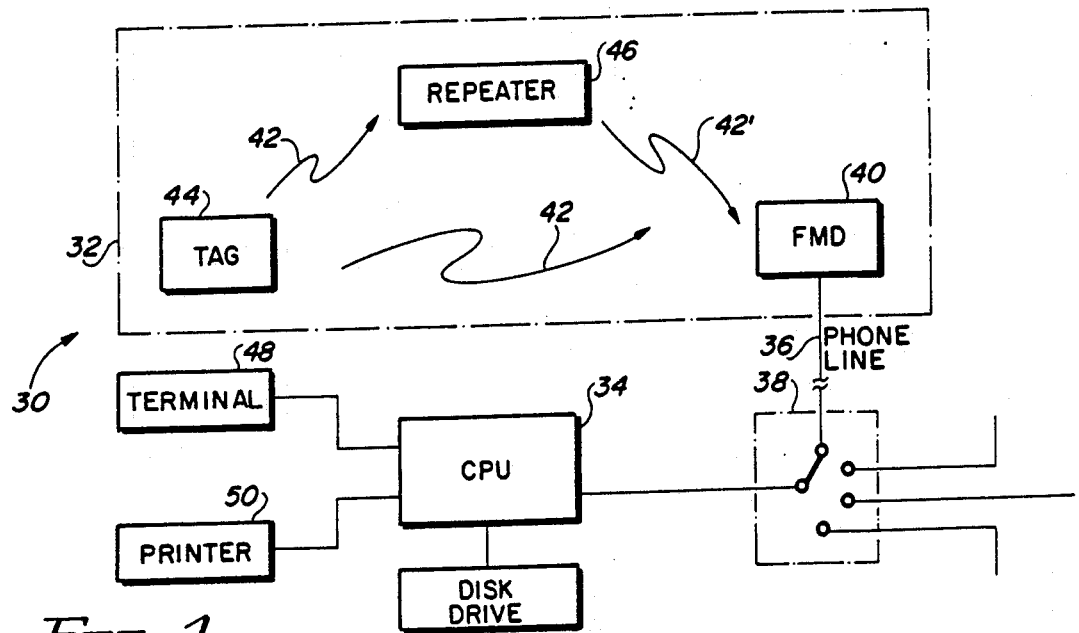
FIG. 1 is a block diagram of the house arrest monitoring system of the present invention.

Referring first to FIG. 1, there is shown a block diagram of a house arrest monitoring system 30 in accordance with the present invention. The system 30 includes a plurality of remote monitoring areas 32 and a central processing unit (CPU) 34. The CPU 34 is coupled to the remote monitoring area 32, in accordance with the preferred embodiment, by way of a residential phone line 36. One or more conventional switching stations 38 couple the phone line 36 to the CPU 34. Such switching stations 38 are conventional switching stations commonly employed by the telephone company.

Within each remote area 32 there is included a field monitoring device (FMD) 40 The FMD 40 receives periodic signals 42 from an identification tag 44. These identification signals 42 contain information that uniquely identifies the tag 44 from which the signal originates, and that indicates the status of the circuits internal to the tag, and especially whether such circuits have sensed an attempt to remove the tag.

Depending upon the particular characteristics of the remote monitoring area 32, the system may also include a repeater 46 that can be selectively positioned within the area 32. The purpose of the repeater 46 is to receive the identification signals 42 from the tag 44 and retransmit these signals, after a short delay, to the FMD 40; to eliminate dead spots. Such retransmitted signals are identified in FIG. 1 as signals 42'.

While only one tag 44 is shown within the remote monitoring area 32 of FIG. 1, the system of the invention contemplates that a pluarlity of tags 44 within the monitoring area 32 could be monitored by the same FMD 40, each tag generating its own unique identification signal at periodic intervals.

The CPU 34 can be coupled through the telephone switching network 38 to a large number of remote monitoring areas. As will be explained below, the CPU 34 will typically randomly poll each of the remote monitoring areas with which it can establish a communication link. Coupled to the CPU 34 is at least one terminal 48 that provides a means for the CPU 34 to display the status of the various remote monitoring areas to which it is coupled, as well as to provide an operator the means for entering data or instructions into the CPU. Such terminals 48 are common in the art, typically including a CRT display screen and a keyboard. Also coupled to the CPU 34 is a printer 50 that can be used to print status reports and other information concerning the operation of the house arrest monitoring system 30. Some sample reports generated by the CPU 34 are contained in Appendix B.

Figures 2, 3A:
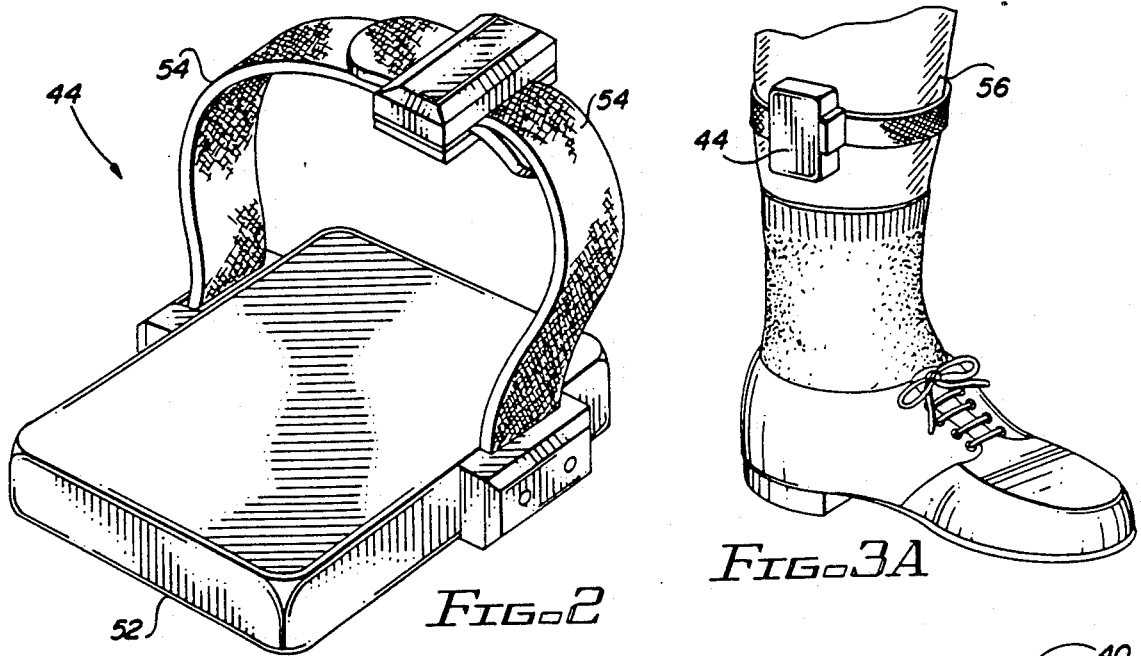
FIG. 2 is a perspective view of the tag that is worn by an individual being monitored by the system of FIG. 1.
FIG. 3A illustrates one manner in which the tag may be worn.
Figure 3B:
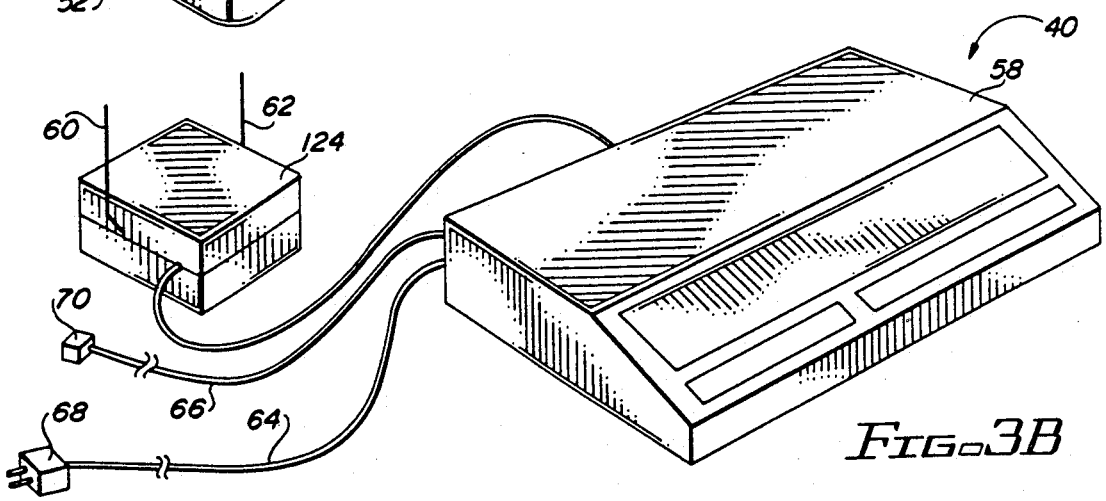
FIG. 3B shows a perspective view of the FMD.

Referring next to FIGS. 2, 3a and 3B, there are shown perspective views of the tag 44 and the FMD 40 that are used within the remote monitoring area 32. The tag 44, as best shown in FIG. 2, includes a case or housing 52 and a connecting strap 54. The tag 44 is designed to be worn around a limb, such as an ankle 56, of its wearer, as shown in FIG. 3a. As explained more fully below, the housing 52 is designed to be comfortably worn against the skin or flesh of its wearer. The tag is worn with just enough tension in the strap 54 to securely hold the housing 52 near the skin or flesh of the person being monitored. Advantageously, the case 52 is made from a material that is impervious to the normal kinds of fluids with which the case may come in contact, such as water, thereby allowing the tag to be worn at all times. As will be explained more fully below, the only requirement to the user is that the tag be held near his or here flesh. Otherwise, a temper condition will be detected by the circuits within the tag 44.

The case 52 is made from polystyrene, a type of plastic that is hard and durable. In the preferred embodiment, the tag measures no more than three inches square by one inch thick. It weighs less than eight ounces. The straps 54 are made from a commercially available conductive material.

In FIG. 3b, a perspective view of the FMD 40 and receiver 124 is shown. The FMD 40 is totally self contained. It is housed in a low profile package or housing 58 that is simple, unobtrusive, and that easily blends into the environment of a typical household. The FMD 40 contains no visible dials or controls that are accessible to those in the household. However, it does include appropriate lights or other indicators to indicate the operating status thereof. Two antennas, 60 and 62, are connected to the receiver 124 which is attached to the FMD 40. These antennas comprise a length of wire that may be hung or draped down behind the unit in a location that is not visible to the casual observer. Also available at the rear of the device is a power line cord 64 and a phone line cord 66. The power line cord 64 includes a twenty-four (24) volt transformer 68 for plugging into a standard 110 volt AC outlet socket. Similarly, the phone line cord 66 may contain a standard quick-connect modular phone jack 70 of the type used for connecting conventional telephones to a telephone line. Alternatively, special retainers may be employed in conjunction with the conventional plugs 68 and 70, and their corresponding sockets, which retainers can only be removed with an appropriate tool or key, and which are wired into the tamper circuits of the FMD 40 (so that any attempt to remove the retainers in order to unplug either the transformer or phone jack signals a tamper condition).

THE TAG

Referring next to FIG. 4, a block diagram of the circuits within the identification tag is shown. A low power circuit 80 serves as an oscillator to provide a basic clock signal for operation of the circuit. Counter circuits 82 count the ocurrence of clock cycles in order to regulate the time at which an identification signal 42 is transmitted from the tag. As indicated previously, an identification signal is transmitted about every 120 seconds. The oscillator 80 and the counter circuits 82 define the 120 second interval (or other selected interval) between transmissions. The 120 second interval is, of course, only exemplary. Other appropriate intervals may be used. Moreover, due to the variation in tolerances of the component values and supply voltages that exist between the oscillator 80 circuits from one tag to another, it is not likely that two tags will ever exhibit precisely the same time interval between transmission of their respective identification signals. This helps assure that no two identification signals from two separate tags will ever continuously occur at precisely the same times, thereby interferring with each other.

The timing signals from the counter circuits 82 are directed to encoding logic 84. A code select circuit 86 defines a unique identification code that is also directed to the encoding logic 84. The encoding logic 84 also receives an indication over signal line 88 as to whether a tamper condition has been detected. The tamper signal and code information are combined in the encoding logic 84 at the appropriate time in order to create a word of encoded data that is passed on to an RF modulator and oscillator 90 over signal line 92. As synchronized by a transmit pulse received over signal line 94 from the counter circuits 82, the RF modulator and oscillator 90 generates an RF carrier signal, modulated with the encoded data, that is transmitted from antenna 96. The identification signal transmitted from the antenna signal 96 is represented by the arrow 42 in the FIG. 4 and FIG. 1.

A mode control circuit 98 is also present within the tag 44. This mode control circuit defines one of four possible operating modes of the circuits within the tag. These four operating modes are discussed in more detail below. The particular mode of operation for the tag is controlled by the selective closing or opening of reed switch 100. The reed switch 100 is embedded within the tag 44, and the selective closure thereof can be effectuated by moving a magnet of sufficient strength within a prescribed distance of the tag. In this way, the operating mode of the tag can be selectively controlled without the use of any external switches, push buttons, or other manually actuated devices accessible on the surface of the tag case or housing 52.

Further included in the tag 44 is a tamper detect circuit 102 and a strap continuity check circuit 104. As explained more fully below, the tamper detect circuit 102 determines whether the tag 44 is being held near the flesh or skin of the tag's wearer. If this circuit detects that the tag is not being held near the skin of the tag wearer, a TAMP signal is generated and sent to a set tamper alert circuit 106 over signal line 108. Similarly, if the strap continuity check circuit 104 determines that the continuity of the strap 54 has been broken, an appropriate alert signal is sent to the set tamper alert circuit 106. Accordingly, in response to either a TAMP signal from the tamper detect circuit 102, or an alert signal from the strap continuity check circuit 104, the set tamper alert circuit 106 generates a tamper signal that is sent to the encoding logic 84 over signal line 88.

Referring next to FIGS. 5 and 6, a description of the tamper detect circuit 102 and the strap continuity check circuit 104 will be presented. The function of the tamper detect circuit 102 is to determine when the tag 44 is being held near the skin or flesh of its wearer and when it is not. This determination is made using a unique body mass detection circuit that includes a first capacitor plate 110 and a second capacitor plate or element 112. In the preferred embodiment, the second capacitive element or plate 112 is realized with the conductive strap 54 (FIG. 2) that holds the tag 44 near the skin (body mass) of its wearer. The plate 110 and strap 112 function as the plates of a capacitor, and the flesh 114 therebetween serves as the diaelectric material of the capacitor that separates one element from the other. An oscillator signal 116 from an oscillator (e.g., a signal derived from the oscillator 80) is applied to strap 112 and is capacitively coupled across the body mass to plate 110. So long as the body mass remains between strap 112 and plate 110, the signal coupled to plate 110 (a 1.1 KHZ signal in the preferred embodiment) appears at the gate of field effect transistor (FET) switch F1. This coupled signal includes negative-going spikes that turn on F1 momentarily. These momentary turn ons are sufficient to maintain parallel capacitors C4 and C5 discharged to a positive volatage potential, +V. (From FIG. 5 it is seen that capacitors C4 and C5 are connected in parallel across F1, with one side of this parallel combination being connected to +V and the other side —the drain side of F1—being connected to signal line 108.) Thus, so long as switch F1 is momentarily turned on, signal line 108 remains high, indicating a non tamper (NON TAMP) condition. If pulses are not coupled through to plate 110, which occurs when the body mass is removed from between the strap 112 and the plate 110, switch F1 does not turn on at all, and the drain side of capacitors C4 and C5 charges through resistor R3 to a negative potential (e.g., ground) causing the TAMP signal to go low. Thus, a low signal on signal line 108 indicates the absence of flesh next to the tag 44. This low signal passes through OR gate 124 and causes a flip flop 126 to be set. The Q output of flip flop 126 functions as the tamper signal that is delivered to the encoding logic 84 (FIG. 4) over signal line 88.

Both the gate 124 and the flip flop 126 are part of the set tamper alert circuit 106. Also included as part of this circuit is an OR gate 128, the output of which is directed to the reset terminal of flip flop 126. One input of the OR gate 128 is the magnet signal obtained from reed switch 100 (FIG. 4). This magnet signal is normally low in the absence of a magnet The other input is connected to signal line 122 (Mode-2 2 signal line), and is low during normal operation. When either the Mode-2 signal or the magnet signal go high, the flip flop 126 is reset.

Also shown in FIG. 5 is the strap continuity check circuit 104. As indicated previously the strap 54 is used to hold the tag 44 near the flesh of its wearer. This strap is made from conductive material. Accordingly, an electrical signal may pass therethrough. One end of the strap is connected to the oscillator signal 116 (a 1.1 KHz signal). The other end of strap 54 is connected to the cathode of diode CR1 of the continutity check circuit 104. The anode of diode CR1 is connected through resistor R8 to the other input of gate 124. This point is also coupled to a negative potential source (e.g., ground) through resistor R9. A holding capacitor C8 is connected to the junction of R8 and one of the inputs of gate 124 During normal operation —that is, when the continuity of the strap 54 is maintained —the oscillator signal will keep capacitor C8 charged to a high level However, should the strap 54 be broken, the voltage appearing on capacitor C8 will discharge through resistors R9 and R8, thereby causing signal line 130 to go low. In turn, this action will cause flip flop 126, of the set tamper alert circuit 106, to be set, thereby generating a tamper signal.

Referring next to FIGS. 7 and 8, the various operating modes of the tag 44 are explained. As previously indicated in connection with the discussion of FIG. 4, a magnetic reed switch 100 is embedded in the tag 44 at a location where the application of an external magnet can close the switch. (This magnetic reed switch 100 is also identified in FIGS. 7 and 8 as SW1.) The mode control circuit 98 of FIG. 4 is realized with a D-type flip flop 98 as shown in FIG. 7. The D input of flip flop 98 is connected to the Q* (inverse of Q) output of the same flip flop. This same signals also serves as an ENABLE signal for oscillator 80 (FIG. 4). This signal must be low before oscillator 80 can begin to operate. The clock input, or C input, of the flip flop 98 is connected to resistor R10, capacitor C9, and reed switch 100 As indicated in FIG. 7, one side of reed switch 100, which is normally open in the absence of a magnetic field, is tied to the positive voltage reference +V. The other side is tied to one end of resistor R10 Capacitor C9 parallels resistor R10 The clock input of flip flop 98 is connected to that side of R10 that is connected to the magnetic reed switch 100. Accordingly, when the reed switch 100 is open, the signal appearing on the clock input is low. When the reed switch 100 is closed, as when a magnetic field is applied, the clock input rises to the +V potential, thereby changing the state of flip flop 98. (As depicted in the figure, flip flop 98 is clocked on the leading or positive-going edge of the clock signal.)

FIG. 8 defines the various operating modes associated with the mode control circuit 98. When initially manufactured, flip-flop 98 is reset, meaning that the Mode-1 signal is "0", and the Mode-2 signal is "1". This state remains until the reed switch 100 is closed In this initial mode of operation, all of the circuits of the tag, with the exception of flip flop 98, are off, thereby preserving the battery life of the battery 101 included in the tag. It is noted that even though power is applied to flip flop 98, when this flip-flop is a CMOS device, it is also effectively off inasmuch as it draws very little current, except when it is switching from one state to the other.

When a magnet is first applied so as to close the magnetic reed switch 100 (SW1), the flip flop 98 is latched such that the Mode-1 signal is high, or a logic "1" , and the Mode-2 signal is low, or a logic "0" These two signals, in this state, coupled with the Switch (Magnet) signal on signal line 99, define a testing/start-up mode of operation for the tag 44. In this mode of operation, the identification signal is transmitted continuously by the tag. When the external magnet 97 is removed, thereby opening the magnetic reed switch 100, the tag reverts to its normal mode of operation wherein the identification signal is transmitted about every 120 seconds. During this normal mode of operation, the Switch signal is low, the Mode-1 signal remains high, and the Mode-2 signal remains low. If the magnetic reed switch 100 is subsequently closed, thereby causing the Mode-1 signal to go low and the Mode-2 signal to go high, a CW transmit mode of operation is initiated wherein the tag transmits a continuous RF signal which contains no data. This mode of operation is useful during initial set-up and testing. The normal mode of operation is reentered simply by removing, reapplying, and removing the magnet, thereby cycling the flip-flop 98 back through the off and testing/start-up modes to the normal run mode.

Figure 9:
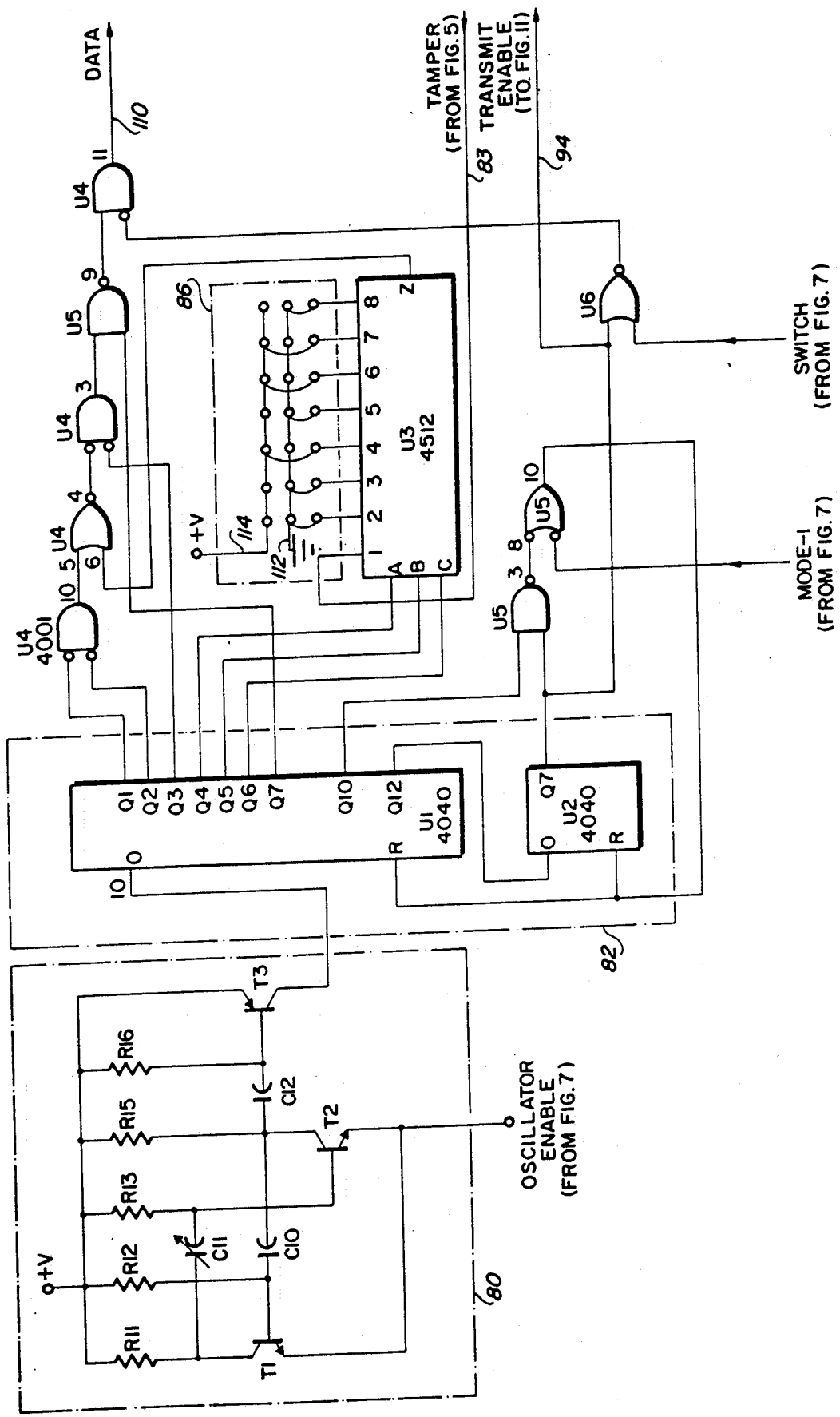
FIG. 9 is a schematic/logic diagram of the ASMV and Encoding Logic of the Tag of FIG. 4.

Referring to FIG. 9, a logic/schematic diagram of the oscillator 80, the Counter Circuits 82, the Encoding Logic 84, and the Code Select Logic 86 of the tag 44 (FIG. 4) is shown. The oscillator 80 is a very low power circuit. The circuit operation is more or less conventional. That is, two NPN transistors T1 and T2 are cross coupled such than when one transistor is off, the other is on, and vice-versa. The cross coupling occurs through the use of capacitor C10, coupling the base of T1 to the collector of T2; and through the use of capacitor C11, coupling the base of T2 to the collector of T1. When T1 turns on, the change in voltage at the collector of T1 is coupled through C11 to the base of T2, thereby turning T2 off. However, the voltage at the base of T2 slowly rises as capacitor C11 is charged through resistor R13. When the turn-on threshold of T2 is reached, T2 turns on, dropping the voltage at the collector of T2, which drop is coupled through C10 to the base of T1, thereby turning off T1. T1 remains off until the voltage at its base rises to its threshold turn-on level, as C10 is charged through resistor R12. The cycle thus repeats itself and T1 and T2 alternately switch between on and off states, thereby causing a periodic signal to appear at the collector of T2. Resistors R11 and R15 are used as pull up resistors, coupling the collectors of T1 and T2 respectively to the positive voltage potential +V.

The emitters of T1 and T2 are tied together and connected to the Oscillator Enable line coming from the Mode Control Circuit 98 (FIGS. 4 and 7). The oscillator 80 can not begin operating until the Enable line goes low. Because it is desirable to operate the oscillator 80 at very low power levels, the currents that flow through T1 and T2 are made very small by making the values of resistors R11 and R15 very large. The frequency of operation is controlled by the values of R12 and C12, and R13 and C10. In the preferred embodiment, the frequency of operation is set at about 2.2 KHz. Coupling capacitor C12 transfers the periodic signal appearing at the collector of T2 to the base of PNP transistor T3, the emitter of which is tied to the +V potential Resistor R16 is a bias resistor that is connected between the base and emitter of T3. The operation of stage T3 serves to square up the edges of the periodic basic clock signal that is generated by the ASMV operation of T1 and T2. The collector of T3, on which appears the basic clock signal, is directly connected to the counter circuit 82.

Counter Circuits 82 are realized with CMOS integrated circuits (IC's) U1 and U2. Each of these IC's contain a sequence of flip flops, the respective outputs of which are designated in the figure as Q1, Q2, Q3, ... Q12. The IC's U1 and U2 are of a type that are readily available from numerous IC vendors under the generic title "12-bit binary counter" and the generic number 4040. (For example, if these devices are procured from Motorola, they are identified as part number MC14040B.)

The respective output signals Q1, Q2, etc , from U1 and U2 comprise square waves that have frequencies that are successively divided by two. Hence, the first state output (designated as Q1 in FIG. 9, although sometimes the first stage is referred to as Q0 in the art) signal has a frequency that is ½ that of the input signal (received from the oscillator 80). The Q2 signal has a frequency that is ½ that of Q1. The Q3 signal has a frequency that is ½ that of Q2, or ¼ that of Q1, and so on All of these signals are combined in the encoding logic 84 in such a way that an encoded data signal 110 is ultimately generated, as best illustrated in the timing diagram of FIG. 10.

An important element in the generation of the encoded data signal 110 is the data encoder U3. This circuit receives a code word that is preselected and hardwired in the code select circuitry 86. As indicated in FIG. 9, Code Select circuitry simply comprises a connection block where up to 7 bits can be selectively hard-wired to be either a logic "1" or a logic "0" by the application of jumper wires, or equivalent, between a ground bus 112 or a voltage bus 114 and an output pin. The code word set by the jumper wires shown in FIG. 9 is thus "0010110", assuming ground is a logic "0" and +V is a logic "1". At appropriate times, as determined by the application of the timing signals Q4, Q5, and Q6, respectively applied to address inputs A, B, and C of encoder U3, the bits defined by the code word are serially passed out the output terminal of U3 designated as pin "Z") to pin 6 of NOR gate U4. These bits are then interleaved into the processing of the other timing signals by gates U4, U5 and U6 to produce the data signal 110 appearing on signal line 110 (pin 11 of U4), as illustrated in the timing diagram of FIG. 10. It is noted that the signals shown in FIG. 10 are exemplary only, and are not intended to be limiting.

Referring next to FIG. 11, a schematic diagram of the RF Modulator and Transmitter 90 of the identification tag 44 is shown. NPN transistor T4, crystal Y1, inductor L1, and capacitor C13 comprise a local oscillator stage that is enabled whenever the Transmit line 94 is high. In the preferred embodiment this stage oscillates at approximately 75 MHz. The Transmit signal is coupled to the base of T4 through resistor R20, thereby providing a bias signal that allows T4 to oscillate at a frequency that is controlled by the crystal Y1. The Switch signal 99 is also coupled to the base of T1 through resistor R21. During normal operation, it will be recalled that the Switch signal is low, and therefore it does not influence the local oscillator stage. However, during certain modes of operation (see FIGS. 7 and 8), this signal goes high (when reed switch 100 closes), thereby enabling the local oscillator to generate the 75 MhZ signal.

Capacitor C17 and resistor R22 are connected in series in the collector circuit of T4. A primary winding of transformer TR-1 is connected in parallel with C17. The inductance associated with TR-1 and the capacitance of C17 are selected to be tuned at approximately 152 MHz , thereby causing these components to function as a frequency doubler circuit.

A secondary winding of TR-1 is coupled to the bases of NPN transistor pair T6 and T7 through capacitors C15 and C16 respectively. The emitters of T6 and T7 are connected together, as are the collectors Resistors R24 and R25 are connected to the base terminals of T6 and T7 respectively to provide a bias current therefor. The joined emitters are connected to the collector of NPN transistor T5, the base of which is coupled through resistor R26 to the data signal line 110. Transistors T6 and T7 function as a rectifier circuit with respect to the 150 MHZ signal applied to their base terminals, thereby serving the function of another frequency doubler circuit. The emitter of another NPN transistor T8, with its base terminal grounded, is connected to the collectors of T6 and T7. The collector of T8 is connected to one side of a tank circuit made up of capacitor C18 and inductor L2. Inductor L2 functions as the antenna 96 of the tag 44. The other side of this tank circuit is coupled to the +V potential through resistor R23. Capaitors C19 and C20 are also used to shunt undesired high frequencies to ground appearing at the junction of C18, L2 and R23. Transistors T6, T7 and T8 may be realized with an MPS 5179 transistor, manufactured by Motorola. Transistor T5 may be a 2N3904.

In operation, whenever the transmit signal goes high, data appearing on signal line 110 modulates the current that is allowed to flow through the tank circuit comprised of C18 and L2. The basic frequency of this signal is approximately 303 Mhz, modulated (turned off and on) by the data signal. When the Transmit, Switch, and Data signals are all low, which is 1 but a very short period of time (see FIG. 10), the RF Modulator and Transmitter Circuit 90 is completely shut off, thereby preserving power.

As is evident from the description thus far given, the tag 44 generates an identification signal 42 that is periodically transmitted, approximately every 120 seconds, in a group of short data bursts. This identification signal is generated at all times regardless of where the tag is located, that is, regardless of where the person being monitored is located. (Only when a magnet is used to enable a different operating mode of the tag is this pattern of generating the identification signal not followed.) If the person being monitored is within the designated area 32 (FIG. 1), then the identification signal 42 will be received by the FMD 40.

FIG. 12 shows a block diagram of a preferred embodiment of the FMD 40. It includes two antennas 60 and 62 that are spaced-apart a distance that is approximately ¼ wavelength of the RF carrier signal. This distance empirically determined to be optimum for this application although other distance may be used. As described in connection with FIG. 11, in the preferred embodiment, the RF carrier signal is approximatley 303 Mhz. The wavelength of a 303 Mhz. signal is approximately one meter, or about 39 inches. Hence, in accordance with the teachings of the present invention, the antennas 60 and 62 are spaced apart about 9.8 inches.

The receiver 124 receives the signal 42, demodulates it, and passes the demodulated data through switch SW2 to a microprocessor 130. Switch SW2 (also identified as block 126 in FIG. 12) is controlled by watchdog circuit 128. The purpose of the watchdog circuit 128 is to monitor the operation of the FMD, by monitoring the power control circuit 144 (described below), to ensure that the FMD operation is normal If anything unusual occurs in the power circuits, SW2 is opened in order to prevent data from being passed to the microprocessor 130 that might be misinterpreted Microprocessor 130 controls the operation of the FMD in accordance with programs stored in memory 134. These programs control the operation of the FMD so that its desired function is achieved. Address decode and latch circuitry 132 is used by the microprocessor 130 to aid in the accessing of information in memory 134. Data bus 133 allows data to be passed between the memory 134 and the microprocessor 130, as well as to the display and set-up Control circuits 140 and the calendar clock circuits 142. The display and set-up control circuits 140, in turn, interface with manual set devices 136 and audio and visual display and alarm devices 138.

Microprocessor 130 also is connected to modem 148. Modem 148 allows data to be received or sent over the telephone lines. Automatic call-up or dialing circuits are included to enable the FMD to receive or send calls.

The FMD also includes a power supply 146 that provides power to all of the circuits therein. As is explained more fully below, this power supply includes battery backup in the event that line power is lost or interrupted. In order to efficiently use the power from supply 146, especially during battery backup operation, and in order to decrease the amount of power dissipated in the FMD (thereby reducing the amount of heat generated within the unit), the power control circuit 144 advantageously operates the FMD in either a sleep state or a wake-up state. In the sleep state, most of the circuits, with the exception if the calendar clock circuits and certain other circuits that must be fully awake at all times, are essentially turned off (power is not applied thereto), thereby saving power that would otherwise be dissipated. Memory 134 is nonvolatile memory, meaning that the program instructions remain stored therein whether power is applied or not.

Four conditions cause the power control circuit 144 to switch from a sleep state to a wake-up state: (1) the reception of data by the receiver 124; (2) the detection of an FMD tamper condition as sensed by FMD tamper detect circuit 151; (3) the detection of a phone tamper condition as sensed by phone line tamper detect circuit 150; and (4) the generation of a periodic check signal by the calendar clock circuitS 142. The periodic check signal is generated, in the preferred embodiment of the invention, approximately once each minute.

Inasmuch as the invention claimed herein is directed to the tag used with the house arrest monitoring system, further details associated with the FMD 40, or with the CPU 34, will not be given. It is noted that numerous possible configurations for the FMD and the CPU could be realized by those skilled in the art given the disclosure presented herein, and depending upon the particular specifications desired. Further, while the tag has been described by referring to specific embodiments and applications thereof, numerous variations and modifications could be made thereto by those skilled in the art without departing from the spirit and scope of the invention as claimed. Accordingly, the true scope of the invention is best determined by referring to the claims.

What is claimed is:

1. A tag for use with an individual monitoring system, said individual monitoring system including means for monitoring the presence or absence of an individual wearing said tag within a defined area, said tag including:
   a self-contained power source;
   tamper sensing means for sensing any attempt to tamper with the operation of said tag, including any attempt to remove said tag from an individual wearing said tag; and
   circuit means coupled to said power source for generated an encoded data signal, said encoded data signal comprising a plurality of bits that make up a preselected code word that identifies a particular tag, and at least one tamper bit that identifies any tamper attempt sensed by said tamper sensing means;
   whereby said encoded data signal provides an indication, when generated, of whether the operation of the tag identified by said preselected code word has been tampered with.

2. The tag as set forth in claim 1 wherein said tag further includes:
   means for generating and transmitting a radio frequency (RF) signal; and
   means for modulating said RF signal with said encoded data signal;
   whereby an indication of whether the operation of the tag identified by said preselected code word has been tampered with may be transmitted by said RF signal to a location remote from said tag.

3. The tag as set forth in claim 2 wherein said preselected code word comprises seven bits, and said at least one tamper bit comprises one bit, whereby said encoded data signal comprises an eight bit word.

4. The tag as set forth in claim 1 wherein said tag includes means for holding said tag near the flesh of an individual wearing said tag, and wherein said tamper sensing means includes means for sensing whether said tag is held near human flesh, a tamper attempt being detected whenever the tag is removed away from human flesh.

5. The tag as set forth in claim 4 wherein said tag holding means comprises a strap, and wherein said tamper sensing means further includes means for checking the continuity of said strap, a tamper attempt being detected whenever the continuity checking means indicates the continuity of said strap has been broken.

6. The tag as set forth in claim 5 wherein said at least one tamper bit comprises one bit that is set to indicate a tamper attempt if either: (1) said means for sensing whether the tag is held near human flesh indicates the tag has been removed away from human flesh; or (2) said continuity checking means indicates the continuity of said strap has been broken; whereby said one tamper bit indicates whether any of a plurality of tamper attempts sensed by respective tamper sensing means has been made.

7. A tag for use in a personnel monitoring system comprising:
   an enclosed housing adapted to be worn by an individual being monitored by said personnel monitoring system;
   means within said housing for generating an identification signal that uniquely identifies said tag;

tamper sensing means within said tag for sensing any attempt to remove said tag from an individual wearing said tag, and for generating a tamper signal in response to such sensing; and means for combining said identification signal and said tamper signal into an encoded data signal, a first portion of said encoded data signal comprising at least one data bit indicative of said tamper signal, and a second portion of said encoded data signal comprising a plurality of data bits indicative of said identification signal;

whereby the first portion of said encoded data signal provides an indication of whether any attempt has been made to remove the tag identified by the second portion of data bits of said encoded data signal.

8. The tag as set forth in claim 7 further including means for generating a radio frequency (RF) signal, means for modulating said RF signal with said encoded data signal, and means for periodically transmitting said modulated RF signal to a location remote from said tag.

9. The tag as set forth in claim 8 wherein said tamper sensing means includes means for sensing whether said enclosed housing is being held near the skin of the individual wearing said tag.

10. The tag as set forth in claim 9 further including strap means for holding said enclosed housing near the skin of the individual wearing said tag, and wherein said tamper sensing means further includes means for sensing whether said strap means has been broken or cut.

11. A method of signaling a tamper condition in a tag adapted to be worn by an individual being monitored by an electronic monitoring system, said tag including circuit means for detecting any attempt to remove the tag from the individual, and means for generating and transmitting a status signal to be location remote from said tag, said method comprising the steps of:

(a) generating within said tag a digital multi-bit code word that uniquely identifies said particular tag;

(b) generating within said tag a digital tamper signal having at least one bit in response to said detecting means detecting an attempt to remove the tag from the individual;

(c) combining said multi-bit code word and said tamper signal in an encoded data signal, said encoded data signal having at least one bit representative of said tamper signal, and a plurality of bits representative of said multi-bit code word; and (d) transmitting said encoded data signal as said status signal to a location remote from said tag;

whereby an examination of said at least one bit of said encoded data signal at a location remote from said tag provides an indication as to whether any attempt has been made to remove the tag identified by the plurality of bits representative of said multi-bit code word from the individual wearing said tag.

* * * * *